United States Patent [19]

Janus et al.

[11] Patent Number: 4,634,872

[45] Date of Patent: Jan. 6, 1987

[54] PROCESS FOR CHECKING THE AUTHENTICITY OF DOCUMENTS AS WELL AS APPARATUS THEREFOR

[75] Inventors: Cornelis D. Janus, Bilthoven; Alle Wielenga, Nieuwerkerk a/d IJssel, both of Netherlands

[73] Assignee: Jadrimex Automation Group B.V., Bunnik, Netherlands

[21] Appl. No.: 585,476

[22] Filed: Mar. 2, 1984

[30] Foreign Application Priority Data

Mar. 3, 1983 [NL] Netherlands ........................ 8300784

[51] Int. Cl.[4] ........................ F21V 9/16; G01T 1/04

[52] U.S. Cl. ........................ 250/458.1; 250/461.1; 250/472.1

[58] Field of Search ............... 250/458.1, 459.1, 461.1, 250/485.1, 372, 472.1; 283/89, 90, 91, 92; 356/72, 73, 237, 71, 382, 432; 209/534, 576, 577, 578, 588

[56] References Cited

U.S. PATENT DOCUMENTS

| | | | |
|---|---|---|---|
| 2,059,197 | 11/1936 | Backer et al. | 356/71 |
| 2,099,012 | 11/1937 | Goodrich et al. | 356/237 |
| 3,842,281 | 10/1974 | Goodrich | 250/485.1 |

FOREIGN PATENT DOCUMENTS

| | | | |
|---|---|---|---|
| 2428975 | 1/1975 | Fed. Rep. of Germany . | |
| 2406634 | 8/1975 | Fed. Rep. of Germany . | |
| 2382060 | 10/1978 | France | 250/372 |

*Primary Examiner*—Janice A. Howell
*Attorney, Agent, or Firm*—Fleit, Jacobson, Cohn & Price

[57] ABSTRACT

Process and apparatus for checking the authenticity of valuable documents by subjecting the document to be checked in a closed room to at least incident light, transmitting and floodlight, especially floodlight at angles of 0 tot 15°. Apparatus is described with document examination places without relative interference of the different radiation.

8 Claims, 2 Drawing Figures

PROCESS FOR CHECKING THE AUTHENTICITY OF DOCUMENTS AS WELL AS APPARATUS THEREFOR

BACKGROUND OF THE INVENTION

The invention relates to a process for checking documents as well as an apparatus therefor.

The invention relates particularly to the checking of offered banknotes and other valuable documents such as passports, identity-cards, drivers' licenses, cheques etc. which hereinafter will be generally called documents.

It is known to check such documents by means of an apparatus with which the documents are illuminated by UV-light. Although such an apparatus provides a fast check of the genuineness of banknotes, making the typical characteristics of a banknote clearly visible, no other falsifications are traced. It is desirable to check water-signs, as well as falsifications of names, inscriptions, signatures, data, etc.

For this purpose one has to take resource to other apparatuses or design special control means. This is in practice rather cumbersome. Thus there exists a need for an easily utilisable and handable apparatus by which one can check papers of value as well as other documents for genuineness.

SUMMARY OF THE INVENTION

The invention has as its main object to provide a compact apparatus with which it is possible to acquire as much information as possible about the documents offered as well as their authenticity. The apparatus according to the invention has the advantage that because a combination of different techniques are provided, especially floodlight under different angles, several checks or controls may be effected simultaneously owing to which time and room are saved without a need for special laboratory equipment.

Briefly the invention comprises a process and apparatus for checking the authenticity of valuable documents, characterized in that the document to be checked is investigated in an enclosed housing by at least incident light, transmittent light and floodlight. Preferably the incident light will be UV or fluorescent light, the transmittent and floodlight will substantially be white light, the incident angles for the floodlight amounting to preferably 0 to 15 degrees.

The apparatus according to the invention comprises a housing wherein are included an UV-light source and a normal light source, which are joined in such a way that the document can be investigated by UV-radiation, exposure to transmission and floodlight.

The apparatus comprises a housing provided with a UV-source which is placed in such a way that it is in cooperation with a standard table surface, on which the document is placed for checking purposes. An at least white light transmitting lamp is placed in such a way that the light in transmission is incident on a measuring table as well as light conduction means by which the object to be checked by floodlight can be exposed. Preferably the UV-source comprises two non-interfering UV lamps by which use of the apparatus in full daylight is possible.

The apparatus is further constructed in such a way that there are provisions by which the light species, respectively the light colours used, will not affect each other when the apparatus is switched on. If required, additional documents can thus be simultaneously investigated.

The white light source is preferably put under a light transmittent plateau, on which the object to be checked is placed, and is provided with screening or reflecting hoods by which white touching light or floodlight will be reflected to other places of investigation.

The white light source and the UV-source are preferably separated, for instance by screens which do not transmit light. Those light sources may also be connected to an ON/OFF-circuit by which, when one lamp is activated the other is automatically switched off. In another modification the UV and an at least white light transmitting light source may be included in one lamp and connected ON/OFF.

With this solution the construction of the lamp is however more expensive while more screening and reflection hoods have to be located to conduct the light. Preferably therefor two separate light sources are used. The screening and reflection hoods or screens which are used to generate floodlight may be made adjustable as to the angle in order to variate the angle of incidence of the floodlight.

It is also possible to locate the screening place for the floodlight on a plateau which is adjustable in respect of the housing of the apparatus, at least as concerns its inclination. It is also possible to have the screening place for the floodlight coincide with the screening place for the UV-light in order to save space.

The light transmitting plateau suitably consists of a light transmitting material, for instance plastic, such as acrylate or also kinds of glass species, which are attached to the apparatus by means of connecting strips, and which function as an observation screen. This plateau is preferably releasably mounted and may if desired be replaced by another light transmitting plateau, for instance transmittable for selected coloured light beams, and it may also be coloured itself. It is of course possible to use diaphragms and/or filters.

Instead of UV-light one may also use other fluorescent light with which the desired effects are achievable. It is clear that the wave lengths will be adjusted dependent on the object to be screened, by selection of the lamp or filters.

For the visible light, preferably white light, it has been found that such lamps are of advantage as give light with a wave length of about 500 to 600 nm. Said lamps may be of the TL type or any other species.

The location of the lamps, the kinds of lamps as well as the light conductors and the screening places themselves may all be made adjustable. Preferably the desired adjustment is made by means of the light conductors, especially for the floodlight, whereafter the wave length of the light is determined by selection of the lamp.

For a given screening apparatus which for instance is mainly destined for the screening of passports, a fixed location or adjustment is determined by previously carried out experiments, and preferably two screening places for floodlights are present, which may be incident with various selected angles.

BRIEF DESCRIPTION OF THE DRAWINGS

The invention will now be illustrated by means of the figures which comprise an embodiment of the apparatus according to the invention containing several screening places.

DETAILED DESCRIPTION OF THE PREFERRED EMBODIMENTS

Figure 1:
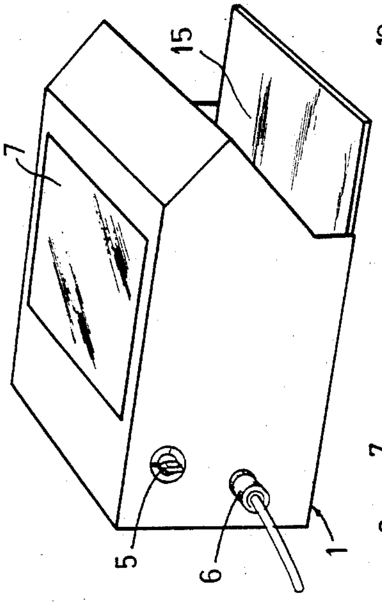
FIG. 1 shows a perspective view of the apparatus.
Figure 2:
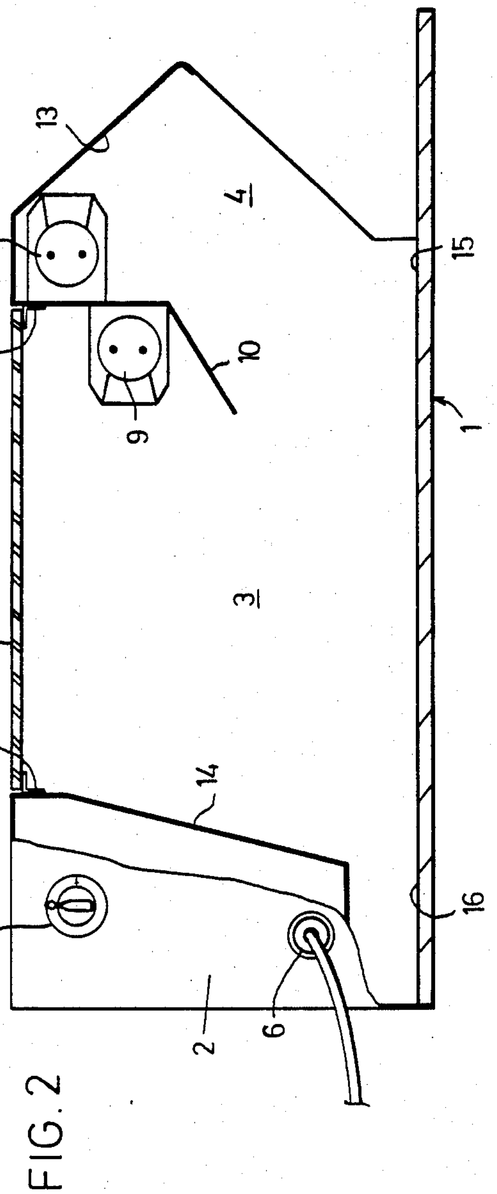
FIG. 2 illustrates an elevational view, partly in cross-section, wherein the essential parts of the apparatus are substantially shown.

In these figures the housing is indicated by 1, for instance existing of aluminum strips, which is made of three parts. The left hand part 2 is for termination of the main voltage, the central part 3 is for measuring with transmitting light and part 4 is for the incident UV light, both parts 3 and 4 containing screening places for flood-light.

In part 2, the switch 5 with voltage connenction 6 is shown.

In part 3, the light transmitting plateau or strip 7 is present, consisting, for example, of acrylate plastic, which by means of mounting strips 8 is fixed to the upper part of the house. This pleateau is illuminated from the bottom by lamp 9 which radiates mainly white light and is provided with a screening and reflecting hood 10 for the floodlight. In part 4, UV-lamp(s) 12 or a lamp(s) giving fluorescent light is (are) present, which is surrounded by reflecting screen 13.

The document to be investigated is put before the UV-radiation on the plateau 15 in part 4, by which plateau screening through flood or touching light is likewise possible, while on plateau 16 in part 1 is only possible an investigation with flood or touching light.

In part 2 there are further present TL-preswitch apparatuses, TL-starters and starter containers, which however are well known apparatuses and for clearness sake are not indicated.

A front view shows consecutively, from above to below, the screening and reflecting hood (13) for UV-light of BLB (black-light-blue-TL) or other fluorescent light, the screening and protecting hood (10) with reflection for white light, and the back part of the reflecting screen 14. There are screening places for investigation on the front and back side of the housing.

On the back side are the room for the switching apparatus and the examination plateau. In the plan view one will see consecutively part 2, thereafter the screening plateau 7 for transmitting light, the screening hood for UV or fluorescent light 13 and finally both screens 10 and 14.

When carrying out a control measurement one proceeds as follows: the banknote or other document is placed in the apparatus at the front side under the blue coloured (fluorescent) lamp(s) or other type of lamp for UV or fluorescent light. After switching on this lamp, one is able to observe that by means of a fluorescent or absorption reaction of the light on or in the paper, if the bank note or any other document is counterfeit or falsified. In addition, any imitated water marks (such as a print with a light coloured type of ink) would strongly shine in contrast to the other part of the bank note. The fibers, as included in genuine bank notes, will under this lamp radiate fluorescingly. In counterfeit specimens such fibers are lacking.

To check a possible falsification by means of inscriptions with chemical means or other falsifications, the banknote or document is placed under the UV-light. Falsifications are contrastingly visible by the fluorescent or absorbing reaction of the UV-light on or in the paper of the banknote or document.

On the white coloured plateau of plastic of the apparatus with the white light source switched on, any watermark present in the paper will become clearly visible.

In case of falsification by means of a mechanical erasure, certain details of the doucment are removed, erased or scratched out by gum, sharp object or pins, whereafter other (falsified) details are inserted in the document. The mechanical erasure has as a consequence that besides the ink (printed or written), also fibers of the layer of paper (linen or satin) are removed or damaged. For this type of falsification the object to be checked is placed on the transparent plateau. The light source will shine through the paper or linen of the object to be checked. The damage of the paper or linen has as a consequence that the layer in that spot becomes thinner, and thus transmits more light than the surrounding, not-counterfeit part of the object to be checked. With such a falsification light spots are visible.

When checking by means of floodlight the object in question is placed in the apparatus below the lamp which is at least radiating white light at the front side 15 or in the narrow opening at the back side of the apparatus, onto the plateau 16. In both cases the white light illuminates the object under a small angle, which angle preferably is adjustable by adjustment of the angle of the reflecting screens. Typically this angle is not larger than 5 to 10 degrees. Die stamps and imitations of watermarks and relief printing by means of pressing will become clearly visible and can be investigated. The possibility for an examination by floodlight is a very favorable addition of the verification search, details being revealed which can not be shown by other means of radiation.

From the above it follows that such an examination can be made in an efficient quick manner and provides practically all details which are necessary for the examination of falsifications and counterfeits.

We claim:

1. An apparatus for examining the authenticity of a valuable document, said apparatus comprising:

a housing;

light means mounted in said housing for irradiating said document with incident light;

lamps means mounted in said housing for irradiating said document with one of transmitted light and flood light;

a first compartment containing said lamp means;

platform means for transmitting light from said lamp means;

a first screening location located on said platform means for examining a document by transmitted light from below said platform means;

a second compartment containing said light means;

a second screening location being illuminated by incident light from said light means; and a third screening location illuminated from above by floodlight from said lamp means.

2. An apparatus for examining the authenticity of a valuable document according to claim 1, wherein said lamp means radiates said document with one of white and colored light.

3. An apparatus for examining the authenticity of a valuable document according to claim 1, wherein said light means radiates said document with one of fluorescent and UV-light.

4. An apparatus for examining the authenticity of a valuable document according to claim 1, further comprising at least two compartment defined by said housing, a first compartment containing said lamp means, a platform means for transmitting light from said first compartment, a first screening location located on said platform means for examining a document by transmitted light from said lamp means, a second compartment containing said light means, a second screening location being illuminated by incident light from said light means, and a third screening location illuminated by floodlight from said lamp means.

5. An apparatus for examining the authenticity of a valuable document according to claim 1, wherein said lamp means is positioned to illuminate said third screening location with floodlight at an angle between 0° to 30°.

6. An apparatus for examining the authenticity of a valuable document according to claim 5, wherein said angle is between 0° to 15°.

7. An apparatus for examining the authenticity of a valuable document according to claim 1, wherein said floodlight from said lamp means has a wavelength of 500 to 600 nm.

8. An apparatus for examining the authenticity of a valuable document according to claim 1, wherein said second screening location is illuminated by one of incident light from said light means and floodlight from said lamp means.

* * * * *